(12) United States Patent
Jang

(10) Patent No.: US 9,014,892 B2
(45) Date of Patent: Apr. 21, 2015

(54) CONTROL SYSTEM AND METHOD FOR HYBRID VEHICLE

(71) Applicants: Hyundai Motor Company, Seoul (KR); Kia Motors Corporation, Seoul (KR)

(72) Inventor: Sang Pil Jang, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 161 days.

(21) Appl. No.: 13/713,981

(22) Filed: Dec. 13, 2012

(65) Prior Publication Data

US 2014/0121875 A1 May 1, 2014

(30) Foreign Application Priority Data

Oct. 29, 2012 (KR) .................. 10-2012-0120182

(51) Int. Cl.
*B60W 20/00* (2006.01)
*B60W 10/02* (2006.01)
*B60W 10/06* (2006.01)
*B60W 10/08* (2006.01)

(52) U.S. Cl.
CPC .............. *B60W 20/10* (2013.01); *B60W 10/02* (2013.01); *B60W 10/06* (2013.01); *B60W 10/08* (2013.01); *B60W 2510/082* (2013.01); *B60W 20/40* (2013.01); *Y02T 10/6286* (2013.01)

(58) Field of Classification Search
USPC .................................. 701/22; 475/5
See application file for complete search history.

(56) References Cited

U.S. PATENT DOCUMENTS

| | | | |
|---|---|---|---|
| 2002/0016660 A1* | 2/2002 | Suzuki et al. | 701/62 |
| 2009/0287366 A1* | 11/2009 | Davis et al. | 701/22 |
| 2010/0094494 A1* | 4/2010 | Jerwick | 701/22 |
| 2012/0109439 A1* | 5/2012 | Akebono et al. | 701/22 |
| 2012/0316715 A1* | 12/2012 | Suzuki | 701/22 |

FOREIGN PATENT DOCUMENTS

| | | |
|---|---|---|
| JP | 2002-349310 A | 12/2002 |
| JP | 2006-306207 A | 11/2006 |
| JP | 2008-207643 A | 9/2008 |
| JP | 2008-230409 A | 10/2008 |
| JP | 2011-073483 A | 4/2011 |

\* cited by examiner

*Primary Examiner* — Helal A Algahaim
*Assistant Examiner* — Michael Fouche
(74) *Attorney, Agent, or Firm* — Mintz Levin Cohn Ferris Glovsky and Popeo, P.C.; Peter F. Corless

(57) ABSTRACT

Disclosed is a control method for a hybrid vehicle that couples an engine clutch promptly while minimizing consumption of battery SOC and deterioration of fuel ratio, and further improves acceleration of the vehicle even in a situation in which a driver works an acceleration pedal deep during an EV mode.

8 Claims, 2 Drawing Sheets

CONTROL SYSTEM AND METHOD FOR HYBRID VEHICLE

CROSS-REFERENCE TO RELATED APPLICATION

This application claims under 35 U.S.C. §119(a) the benefit of Korean Patent Application No. 10-2012-0120182 filed Oct. 29, 2012, the entire contents of which are incorporated herein by reference.

BACKGROUND (a) Technical Field

The present invention relates to a control system and method for a hybrid vehicle, and more particularly, to a system and method of controlling a vehicle employing a parallel type hybrid power train in which a motor is mounted to a side of a transmission.

(b) Background Art

In a parallel hybrid vehicle utilizing a transmission mounted electric device (TMED), an engine, an engine clutch, a motor, and a transmission are sequentially connected to each other such that both an electric vehicle (EV) mode (i.e. powered only by the motor) and a hybrid electric vehicle (HEV) mode (i.e. powered by the engine and the motor) are allowed by controlling the engine clutch.

A vehicle employing such a parallel type hybrid power train is driven only by the motor by releasing the engine clutch while manipulating an acceleration pedal to a small extent ("slight"). The vehicle is driven by driving forces of the engine and the motor by coupling the engine clutch while manipulating the acceleration pedal to a large extent ("deep").

If the driver initially works the acceleration pedal slightly to increase the speed to a predetermined speed using the motor, and then works the acceleration pedal deep, an RPM of the engine and an RPM of the motor are synchronized to solve an impact of the vehicle due to a coupling of the engine clutch, and then the engine clutch is coupled to transfer a torque of the engine to the engine clutch.

If the driver works the acceleration pedal deep, then the vehicle needs to be accelerated even while the RPM of the engine and the RPM of the motor are synchronized. As a result, the motor is driven to a maximum torque. However, if it takes a long time to synchronize the engine and the motor, then the engine clutch is not coupled before the synchronization, the power of the engine is not transferred, and only the motor is driven. This results in a large consumption of the state of charge (SOC) of a battery and results in an inferior fuel ratio.

FIG. 1 corresponds to a method of controlling a hybrid vehicle according to the related art. If an RPM of a motor is higher than an RPM of an engine when an operator works an acceleration pedal deep during an EV mode, and thus a torque higher than a maximum torque of a motor is necessary, then a speed of the engine is controlled to be synchronized with the RPM of the motor so that a synchronous clutch coupling (S510) for coupling of the engine clutch is performed. If the RPM of the motor is lower than the RPM of the engine, then a slip clutch coupling (S520) is performed in which the engine clutch is synchronized while being slipped and then the clutch is completely coupled after synchronization of the RPMs.

However, during the synchronous clutch coupling (S510), when the RPM of the motor increases rapidly so as to reduce the RPM of the engine, the vehicle is driven only by a motor at a maximum output. This excessively consumes an SOC and deteriorates the fuel ratio while also causing the engine to consume fuel through an unnecessary speed control.

This phenomenon occurs because an RPM increment by which an increase of speed of the motor cannot be pursued even when the speed is controlled to a maximum is generated in the engine consuming a fossil fuel.

The items described in the background art are provided just to help understanding of the background of the present invention, and shall not be construed to admit that they correspond to the technologies already known to those skilled in the art to which the present invention pertains.

SUMMARY OF THE DISCLOSURE

The present invention provides a control system and method for a hybrid vehicle which can couple an engine clutch promptly while minimizing consumption of battery SOC and deterioration of fuel ratio. The control system and method improves acceleration of the vehicle even in a situation in which a driver works an acceleration pedal deep during an EV mode such that a torque higher than a maximum motor torque is necessary, and an increment rate of the RPM of the motor is higher than an increment rate at which the RPM of the engine can be increased.

In one aspect, the present invention provides a control method for a hybrid vehicle executed by a processor within a controller installed within the hybrid vehicle. More specifically, this method includes: a coupling type determining process configured to determine whether a synchronous clutch coupling, in which a clutch is coupled after an RPM of a motor and an RPM of an engine are synchronized, should be carried out; a motor increment rate determining process configure to compare an RPM increment rate of the motor and a predetermined reference rate if it is determined in the coupling type determining process that the synchronous clutch coupling should be carried out; and a synchronous clutch coupling deferring process configured to defer the synchronous clutch coupling if it is determined in the motor increment rate determining step that the RPM increment rate of the motor is higher than the reference rate.

According to embodiments of the present invention, the control method for a hybrid vehicle can be configured to promptly couple an engine clutch while minimizing consumption of battery SOC and deterioration of fuel ratio. Further, the control method can improve acceleration of the vehicle even in a situation in which a driver works an acceleration pedal deep during an EV mode so that a torque higher than a motor maximum torque is necessary, and an increment rate of the RPM of the motor is higher than an increment rate at which the RPM of the engine can be increased.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
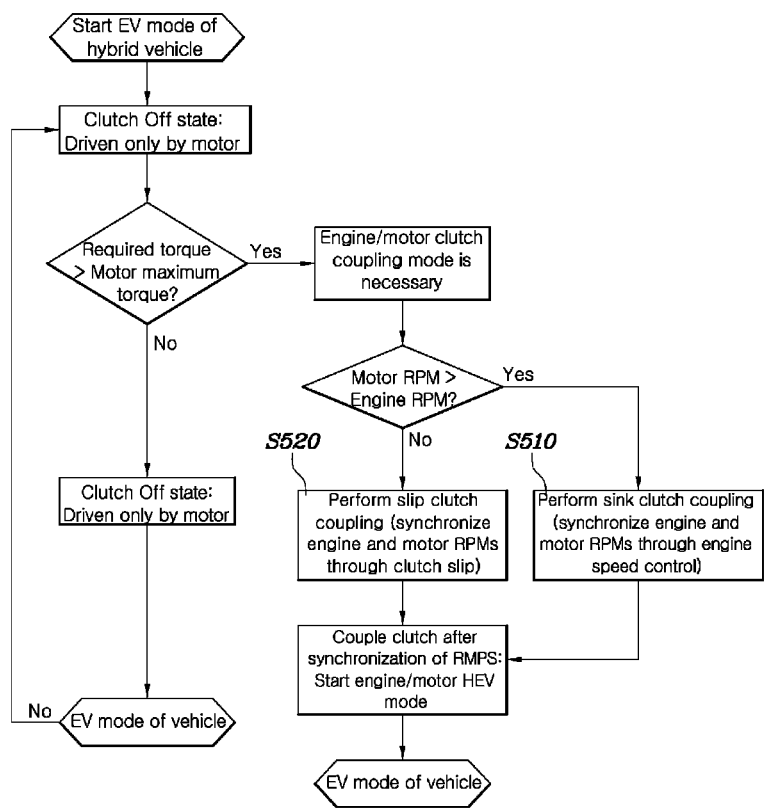
FIG. 1 is a flowchart illustrating a control method for a hybrid vehicle according to the related art.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Figure 2:
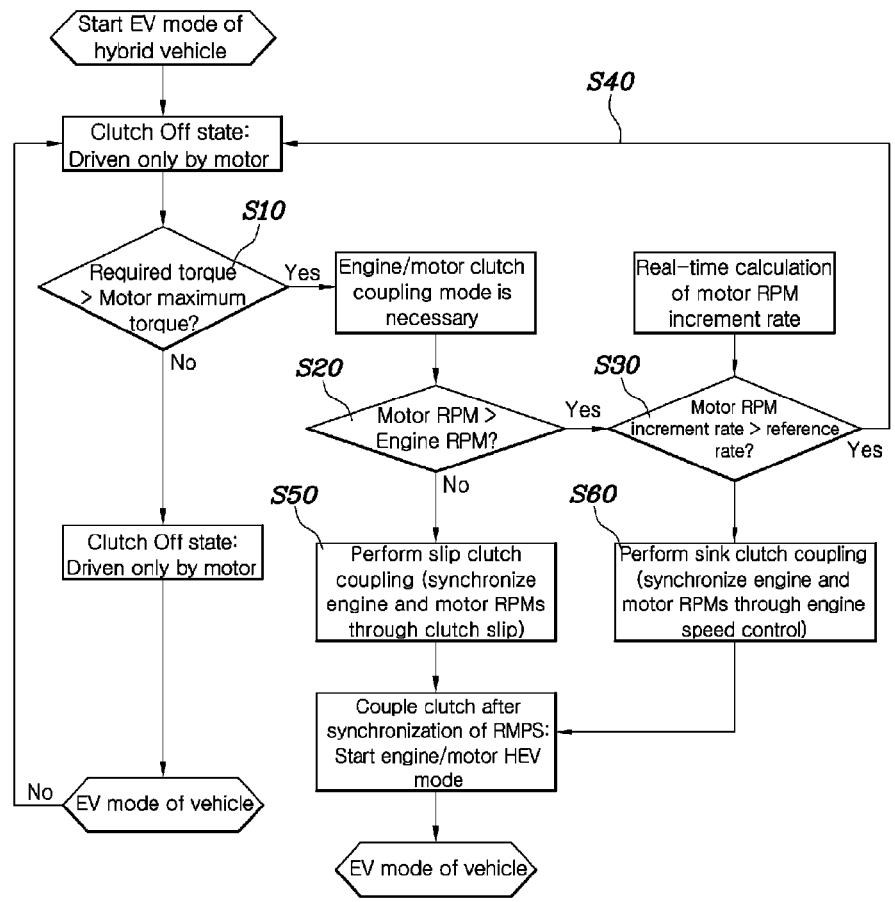
FIG. 2 is a flowchart illustrating a control method for a hybrid vehicle according to an embodiment of the present invention.

Referring to FIG. 2, a control method for a hybrid vehicle according to an embodiment of the present invention includes a coupling type determining process (S20) in which it is determined whether synchronous clutch coupling (S60) should be carried out, in which a clutch is coupled after an RPM of a motor and an RPM of an engine are synchronized; a motor increment rate determining process (S30) of comparing an RPM increment rate of the motor and a predetermined reference rate when it is determined in the coupling type determining process (S20) that the synchronous clutch coupling (S60) is necessary; and a synchronous clutch coupling deferring process (S40) of deferring the synchronous clutch coupling (S60) when it is determined in the motor increment rate determining process (S30) that the RPM increment rate of the motor is higher than the reference rate.

That is, if it is determined in the coupling type determining process (S20) that synchronous clutch coupling should be carried out after synchronizing the RPM of the motor and the RPM of the engine, then it is determined in the motor increment rate determining process (S30) whether the current increment rate of the motor RPM is a level by which the RPM of the engine can be synchronized with the RPM of the motor in a short time through a speed control of the engine. If it is (i.e. a situation exists where a synchronization cannot be performed promptly), than the synchronous clutch coupling is deferred through the synchronous clutch coupling deferring process (S40), and the existing EV mode is continued.

In this case, if the EV mode is continued, then the vehicle is continuously driven by only the motor and only the RPM of the motor increases. Accordingly, if the gear of a high level gearshift stage is engaged, then the transmission ratio decreases, which relatively increases a load of the vehicle and decreases the RPM of the motor. Thus, in the motor increment rate determining process (S30), if it is determined that the motor RPM increment rate is not greater than the reference rate, then the synchronous clutch coupling (S60) is performed (rather than the synchronous clutch coupling deferring process (S40)), and the vehicle is converted to the HEV mode.

Thus, by using the present system and method, fuel efficiency can be improved by reducing or preventing ineffective consumption of a fuel which can result from continuous control of a speed of the engine. Such an improvement in fuel efficiency is accomplished even in a situation in which an RPM of an engine cannot be synchronized with an RPM of a motor through control of the engine speed. Further, the present system and method provides a decrease in transmission ratio and a decrease in RPM increment of the motor due to the EV mode, which allows for a relatively prompt synchronous clutch coupling (S60), thus promoting acceleration and response.

Thus, according to embodiments of the present invention, the predetermined reference rate for comparing the motor RPM increment rate in the motor increment rate determining process (S30) is a maximum change rate of the engine RPM which can be increased through a speed control of the engine or is determined according to the maximum change rate. As such, when a motor RPM increment rate is generated which has a level which cannot be reached through speed control of the engine, the synchronous clutch coupling deferring process (S40) is performed.

As further shown in FIG. 2, when it is determined in the coupling type determining process (S20) that the RPM of the motor is higher than the RPM of the engine, then it is determined that synchronous clutch coupling (S60) should be carried out.

On the other hand, when it is determined in the coupling type determining process (S20) that the RPM of the motor is less than or equal to the engine RPM, then slip clutch coupling (S50) is carried out for slip-controlling and coupling the engine clutch. When it is determined in the motor increment rate determining process (S30) that the motor RPM increment rate is the reference rate or lower, then synchronous clutch coupling (S60) is carried out so as to couple the engine clutch after the RPM of the motor is synchronized with the RPM of the engine.

According to embodiments of the present invention, the control system and method further includes, before the coupling type determining process (S20), a mode conversion determining process (S10). In the mode conversion determining process (S10), when a required torque corresponding to a manipulation amount of an acceleration pedal exceeds a maximum torque in an EV mode, then it is determined that a HEV mode is necessary.

Thus, when it is determined in the mode conversion determining process (S10) that the HEV mode is necessary, then (a) slip clutch coupling (S50) is performed through the coupling type determining process (S20) or (b) synchronous clutch coupling (S60) is performed through the motor increment rate determining process (S30). If it is determined in the motor increment rate determining process (S30) that it is difficult to synchronize the RPM of the engine with the RPM of the motor, then the synchronous clutch coupling (S60) can be quickly deferred through the synchronous clutch coupling deferring process (S40).

While the present invention has been illustrated and described with reference to specific embodiments, it is apparent to those skilled in the art to which the present invention pertains that the present invention may be variously improved and changed without departing from the scope of the present invention.

What is claimed is:

1. A control method for a hybrid vehicle executed by a processor within a controller, the method comprising:
   comparing and synchronizing, by the processor, an RPM of a motor and an RPM of an engine of the hybrid vehicle;
   after an RPM of a motor and an RPM of an engine are synchronized, determining, by the processor, whether to carry out synchronous clutch coupling;
   if it is determined that synchronous clutch coupling should be carried out, comparing, by the processor, an RPM increment rate of the motor and a predetermined reference rate; and
   if it is determined that the RPM increment rate of the motor is higher than the reference rate, deferring, by the processor, synchronous clutch coupling.

2. The control method of claim 1, wherein comparing the RPM increment rate of the motor and the predetermined reference rate is carried out according to a maximum change rate of the RPM of the engine which is increasable by speed control of the engine.

3. The control method of claim 2, wherein it is determined to carry out synchronous clutch coupling when the RPM of the motor is higher than the RPM of the engine.

4. The control method of claim 3, further comprising, before determining whether to carry out synchronous clutch coupling, determining, by the processor, whether a required torque corresponding to a manipulation amount of an acceleration pedal by a driver exceeds a maximum torque in an EV mode.

5. The control method of claim 4, wherein if it is determined that a required torque corresponding to a manipulation amount of an acceleration pedal by a driver exceeds a maximum torque in an EV mode, determining, by the processor, that a HEV mode is necessary.

6. The control method of claim 3, wherein (i) when it is determined that the RPM of the motor is the RPM of the engine or lower, performing, by the processor, slip-controlling and coupling the engine, and (ii) when it is determined that the RPM increment rate of the motor is the reference rate or lower, coupling, by the processor, the engine clutch after the RPM of the motor and the RPM of the engine are synchronized.

7. A non-transitory computer readable medium containing program instructions executed by a processor, the computer readable medium comprising:
   program instructions that compare and synchronize an RPM of a motor and an RPM of an engine of a hybrid vehicle;
   program instructions that determine whether to carry out synchronous clutch coupling;
   program instructions that compare an RPM increment rate of the motor and a predetermined reference rate when it is determined that synchronous clutch coupling should be carried out; and
   program instructions that defer synchronous clutch coupling when it is determined that the RPM increment rate of the motor is higher than the reference rate.

8. The non-transitory computer readable medium of claim 7, further comprising:
   program instructions that determine whether a required torque corresponding to a manipulation amount of an acceleration pedal by a driver exceeds a maximum torque in an EV mode, before the program instructions that determine whether to carry out synchronous clutch coupling; and
   program instructions that determine a HEV mode is necessary when it is determined that the required torque exceeds the maximum torque.

* * * * *